United States Patent [19]
Berner

[11] Patent Number: 5,398,454
[45] Date of Patent: Mar. 21, 1995

[54] SURFACE GRINDING MACHINE

[75] Inventor: Gerd Berner, Stuttgart, Germany

[73] Assignee: Robert Bosch GmbH, Stuttgart, Germany

[21] Appl. No.: 61,968

[22] Filed: May 14, 1993

[30] Foreign Application Priority Data

Jul. 14, 1992 [DE] Germany ............... 42 23 107.8

[51] Int. Cl.⁶ .......................................... B24B 27/027
[52] U.S. Cl. .................................... 451/357; 451/359
[58] Field of Search .......... 51/170 R, 170 T, 170 MT

[56] References Cited

U.S. PATENT DOCUMENTS

| | | |
|---|---|---|
| 2,270,309 | 1/1942 | Kehle .............................. 51/170 MT |
| 4,782,632 | 11/1988 | Matechuk ........................ 51/170 T |
| 5,020,281 | 4/1991 | Neff . |
| 5,123,216 | 6/1992 | Kloss et al. ..................... 51/170 MT |
| 5,239,783 | 8/1993 | Matechuk ....................... 51/170 MT |

FOREIGN PATENT DOCUMENTS 3805926  7/1989  Germany .

Primary Examiner—Jack W. Lavinder
Attorney, Agent, or Firm—Michael J. Striker

[57] ABSTRACT

A surface grinding machine has a transmission housing, a grinding disc arranged movably on the transmission housing, a rotating drive which oscillatingly drives the grinding disc, and an angular transmission for transmitting a rotation of the rotating drive to the grinding disc and formed as a bendable shaft.

18 Claims, 1 Drawing Sheet

SURFACE GRINDING MACHINE

BACKGROUND OF THE INVENTION

The present invention relates to a surface grinding machine.

More particularly, it relates to a surface grinding machine such as for example an angle grinder or an eccentric grinder, which has a transmission housing, and a grinding disc which is movably arranged on the transmission housing and oscillatingly driven by a motor, preferably an electric motor so that an angular transmission transmits the rotation of the motor to the grinding disc.

Surface grinding machines of the above mentioned type are known in the art. One of such machines is disclosed for example in the German document DE-OS 38 05 926. The surface grinding machine disclosed in this reference is formed as an angular grinder. Its angular drive includes a great conical gear pair which is supported in several points and transmits the rotary movement of a motor transversely to its axis. Such angular grinders typically produce a lot of noise and substantially vibrate when high machining costs were not spent for the angular drive parts. The production costs of the surface grinding machine with the use of the angular drive parts produced with low machining costs are high, the handling of the machines is limited.

U.S. Pat. No. 5,020,281 discloses a pneumatic hand tool with a turnable tool holding head and a rotatable tool driven via a bendable shaft. The tool is mounted on the housing together with the tool holding head turnably over a relatively small angle. The bendable shaft can be bent only a little and is loaded with relatively small forces to be transmitted. With this construction it is not possible to adjust an angle between the motor axis and the tool axis to be equal 90°. As a result, in certain applications it cannot be used with the same advantages as the angle grinders.

SUMMARY OF THE INVENTION

Accordingly, it is an object of the present invention to provide a surface grinding machine, which avoids the disadvantages of the prior art.

In keeping with these objects and with others which will become apparent hereinafter, one feature of the present invention resides, briefly stated, in a surface grinding machine of the above mentioned type in which a bendable shaft is formed as an angular transmission.

When the surface grinding machine is designed in accordance with the present invention, it has the advantage when compared with known surface grinding machines with angular transmission in that, it has a substantially simpler and robust construction, low weight, low noise generation and good handling. It has been shown that moreover it has a long service life.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
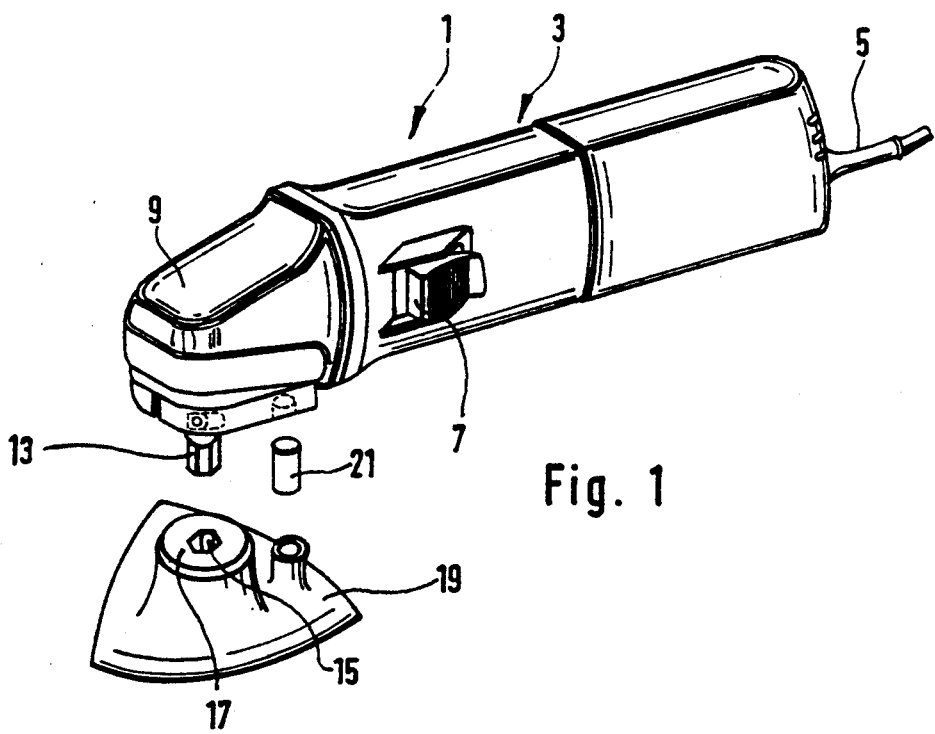
FIG. 1 is a perspective view of a surface grinding machine in accordance with the present invention.

A surface grinding machine shown in FIG. 1 is formed as a vibration grinder 1. It has a motor housing 3 with an electric connecting cable 5 and an on and off switch 7. A transmission housing 9 composed of a synthetic plastic material is arranged on the motor housing 3. An angular transmission shown in FIG. 2 ends in a drive shaft and is arranged in the transmission housing. The end of the drive shaft forms a multi-edge pin 13 which is inserted in a multi-edge opening 15 of an eccentric support 17. The eccentric support 17 is rotatably supported on a grinding disc 19 via a not shown roller bearing. The grinding disc 19 is fixed on the transmission housing by means of at least one elastic supporting member 21 which is designed as a springy rubber column.

Figure 2:
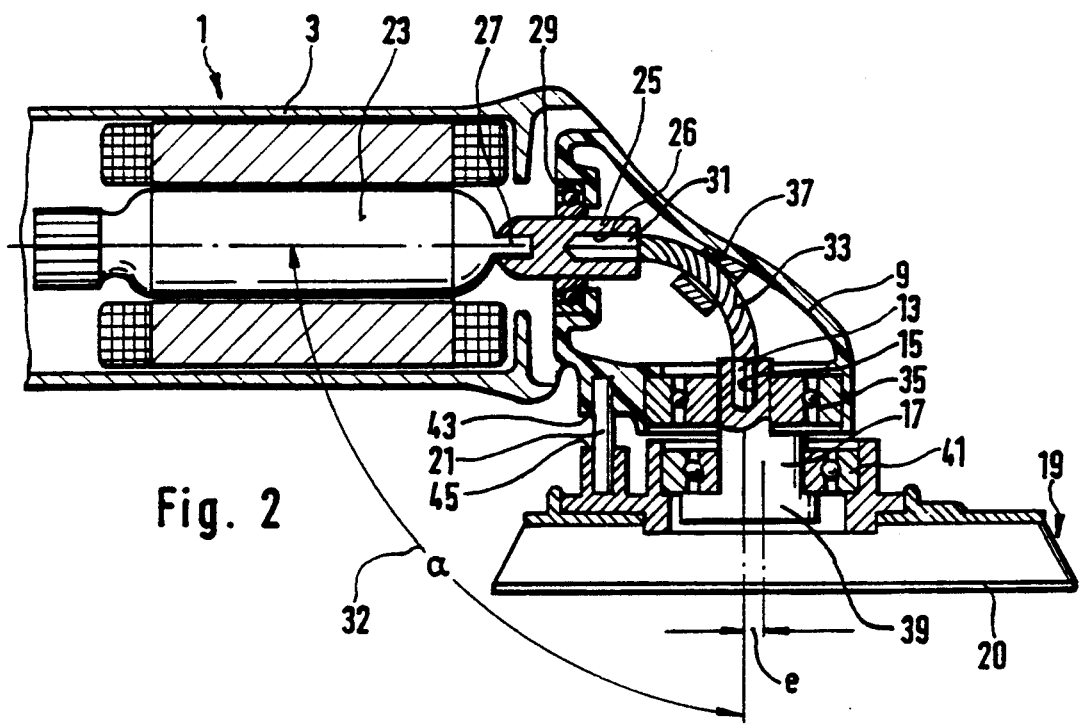
FIG. 2 is a partially sectioned view of the surface grinding machine of FIG. 1.

FIG. 2 which is an enlarged sectional view of FIG. 1, shows the vibration grinder 1 which has the motor housing 3, the transmission housing 9, the multi-edge pin 13, the multi-edge opening 15 of the eccentric support 17, the grinding disc 19 with a grinding sheet 20, the supporting member 21 and the eccentricity e with which the grinding disc 19 vibrates about the axis of the multi-edge pin 13.

A motor 23 has an armature shaft pin 27 which faces the grinding disc 19 and carries an intermediate piece 25 with a multi-edge opening 26. The intermediate disc 25 extends into the transmission housing 9 and is rotatably supported in it by a roller bearing 29. The intermediate piece 25 is fixedly arranged with the armature pin 27 for joint rotation with it on the one hand, and is fixedly coupled with a multi-edge end piece 31 of a bendably shaft 33 for joint rotation with it on the other hand.

The shaft 33 which is bendable by substantially 90° over an angle 32 is inserted with its end piece or in other hand the multi-end pin 13 into the multi-edge opening 15 of the eccentric support 17. The eccentric support 17 in the area of the insertion is rotatably supported by a further roller bearing 35 in the lower region of the transmission housing 9. A central region of the bendable shaft 33 is secured against vibration with a relatively high play by guiding in a short, tubular supporting part 37. The lower end of the eccentric support 17 forms an eccentric pin 39. The pin 39 is held via a third roller bearing 41 axially non-displaceably and rotatably relative to the grinding disc 19. The eccentric support 17 has a non-uniform mass distribution which serves as an unbalance compensation for the movement of the grinding disc 19.

The elastic supporting member 21 which is formed as a rubber column is arranged in abutments 43 and 45 on the drive housing 9 and the grinding disc 19 outside of their centers. It holds the grinding disc 19 at a small angle rotatably on the transmission housing 9.

When the motor 23 is set in rotation by actuation of the on-off switch 7, the armature shaft pin 27 is rotated together with the intermediate piece 25, the bendable shaft 33, the eccentric support 17 and the centering pin 39. Due to the rotation of the eccentric pin 39, a swinging circulating movement of the grinding disc 19 imparted by the supporting member 21 is produced, or an elliptic movement path of the grinding disc 18 or its edge is provided.

With the corresponding selection of the size and material of the supporting member 21 and arrangement of the corresponding rotary speed of the motor 23, this movement leads to an efficient, well controlled movement of the grinding sheet or the working surface of the grinding disc 19, which is especially well suited for the surface grinding along the edges or hollow grooves.

The transmission housing 9 which is composed of a synthetic plastic material efficiently dampens the low noise and vibration between the bendable shaft 33 and its coupling points on the intermediate piece 25 and the eccentric support 17.

Since the supporting member 21 is exchangeable wear repairs can be performed in a simple manner. Moreover, due to changing mass and another material composition of the newly installed supporting member 21 or rubber column, the swinging characteristic of the grinding plate 19 can be changed when needed, so that the tool can perform more or less dampened rotation.

In accordance with a not shown embodiment of the invention, the ends of the bendable shaft are arranged in tubular pieces, in particular pressed, soldered or glued in the pieces. The free end of at least one of the tubular pieces are coupled with the grinding disc and/or the armature shaft-pin by squeezing, multiple edges, or threads. The grinding disc has the basic contour of an arcuate triangle, the supporting member is formed as a parallelepiped or a plate. The grinding disc is fixable relative to the elastic supporting member in different turning positions around its axis. The bendable shaft can be formed as a drilled metal strand, as a spring and the like. The transmission housing is adjustable with the grinding disc relative to the motor housing.

It will be understood that each of the elements described above, or two or more together, may also find a useful application in other types of constructions differing from the types described above.

While the invention has been illustrated and described as embodied in a surface grinding machine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A surface grinding machine, comprising a rigid transmission housing having a tubular narrowing region; a grinding disc arranged movable on said transmission housing; a rotating drive which oscillatingly drives said grinding disc and includes a motor formed as an electric motor; an angular transmission for transmitting a rotation of said rotating drive to said grinding disc, said angular transmission being formed as a bendable shaft, said bendable shaft being formed so as to cover an unchangeable angle of 90°–130° between an axis of said drive and an axis of said grinding disc, said bendable shaft having ends and being guided between said ends in said tubular narrowing region of said rigid transmission housing; and an eccentric pin which is provided at one of said ends of said bendable shaft and supports said grinding disc and drives the latter into a rotating circulating movement so that said grinding disc is supported by said one end of said bendable shaft, said bendable shaft having a central region; and a short immovable tubular supporting part which guides only said central region of said bendable shaft.

2. A surface grinding machine as defined in claim 1, wherein said drive has an armature shaft pin, said armature shaft pin and said grinding disc each having multi-edge openings, said shaft having multi-edge ends which are coupleable with said multi-edge openings of said armature shaft pin and said grinding disc.

3. A surface grinding machine as defined in claim 2, wherein said multi-edge ends of said bendable shaft are formed as multi-edge pins.

4. A surface grinding machine as defined in claim 1, wherein said transmission has an armature shaft pin; and further comprising tubular pieces, said shaft having ends arranged in said tubular pieces, and at least one of said tubular pieces having a free end which is coupled with one of said grinding disc and said armature shaft pin.

5. A surface grinding machine as defined in claim 4; and further comprising means for connecting said ends of said bendable shaft with said tubular pieces, said connecting means being means selected from the group consisting of pressing means, soldering means and glueing means.

6. A surface grinding machine as defined in claim 4; and further comprising means for coupling said free ends of at least one of said tubular pieces with one of said grinding disc and said armature shaft pin, said coupling means being selected from the group consisting of multi-edge means, thread means and squeezing means.

7. A surface grinding machine as defined in claim 1, wherein said grinding disc is formed as a triangular member.

8. A surface grinding machine as defined in claim 1, wherein said grinding disc is formed as an arcuate triangular member.

9. A surface grinding machine as defined in claim 1; and further comprising an elastic supporting member which holds said grinding disc relative to said transmission housing.

10. A surface grinding machine as defined in claim 9, wherein said elastic supporting member is formed parallelepiped.

11. A surface grinding machine as defined in claim 9, wherein said elastic supporting member is formed as a plate.

12. A surface grinding machine as defined in claim 9, wherein said grinding disc has a center, said elastic supporting member is supported on said grinding disc outside of said center.

13. A surface grinding machine as defined in claim 9, wherein said grinding disc has an axis and is fixable relative to said elastic supporting member in different turning positions relative to said axis.

14. A surface grinding machine as defined in claim 1, wherein said transmission housing is composed of a synthetic plastic material and provides a swinging damping.

15. A surface grinding machine as defined in claim 1, wherein said bendable shaft is formed as a drilled metal strand.

16. A surface grinding machine as defined in claim 1, wherein said bendable shaft is formed as a spring.

17. A surface grinding machine as defined in claim 1; and further comprising a motor housing, said transmission housing being adjustable with said grinding disc relative to said motor housing.

18. A surface grinding machine, comprising a rigid transmission housing having a tubular narrowing region; a grinding disc arranged movable on said transmission housing; a rotating drive which oscillatingly drives said grinding disc and includes a motor formed as an electric motor; an angular transmission for transmitting a rotation of said rotating drive to said grinding disc, said angular transmission being formed as a bendable shaft, said bendable shaft being formed so as to cover an unchangeable angle of 90°–130° between an axis of said drive and an axis of said grinding disc, said bendable shaft having ends and being guided between said ends in said tubular narrowing region of said rigid transmission housing; and an eccentric pin which is provided at one of said ends of said bendable shaft and supports said grinding disc and drives the latter into a rotating circulating movement, said grinding disc being formed as an arcuate triangular member so that said grinding disc is supported by said one end of said bendable shaft, said bendable shaft having a central region; and a short immovable tubular supporting part which guides only said central region of said bendable shaft.

* * * * *